(12) United States Patent
Gignac

(10) Patent No.: US 6,707,273 B1
(45) Date of Patent: Mar. 16, 2004

(54) TEMPERATURE/VOLTAGE CONTROLLED BATTERY CHARGING CIRCUIT

(75) Inventor: Roy G. Gignac, Danville, VA (US)

(73) Assignee: Electronic Design & Sales, Inc., Danville, VA (US)

( * ) Notice: Subject to any disclaimer, the term of this patent is extended or adjusted under 35 U.S.C. 154(b) by 0 days.

(21) Appl. No.: 10/198,521

(22) Filed: Jul. 18, 2002

(51) Int. Cl.$^7$ .................................................. H02J 7/04
(52) U.S. Cl. ...................................... 320/150; 320/137
(58) Field of Search ................................ 320/150, 137, 320/154, 134, 136, 144

(56) References Cited

U.S. PATENT DOCUMENTS 4,424,476 A    1/1984   Mullersman ................. 320/36

Primary Examiner—Adolf D. Berhane
Assistant Examiner—Lawrence Luk
(74) Attorney, Agent, or Firm—Olive & Olive, P.A.

(57) ABSTRACT

A battery charging circuit particularly adapted to recharging NiMh batteries utilizes a thermistor to develop a control voltage corresponding to the temperature of the battery being charged and compares such voltage to an accurately measured battery terminal voltage. At a preset condition of a combination of the two voltage readings, the charging circuit converts from charging at a relatively high and fast charging rate to a relatively slow rate corresponding to a trickle current passing around a SCR through which the fast charging current normally flows. The circuit components are selected such that the battery achieves a charge of substantially 95% capacity before switching to the relatively slow rate and enables display of a state of charge indicating that the 95% capacity charge has been achieved and without any "popping" or cyclic ON-OFF effect.

7 Claims, 10 Drawing Sheets

TEMPERATURE/VOLTAGE CONTROLLED BATTERY CHARGING CIRCUIT

FIELD OF THE INVENTION

The present invention is directed to a silicon controlled rectifier (SCR) nickel metal hydride (NiMh) battery charging circuit. More particularly, the present invention relates to a SCR battery charging circuit particularly adapted to charge the kind of battery, such as the NiMh type battery, which has a critical temperature limit and a need for a certain amount of self-generated heat to reach a full capacity of recharge. The invention is further directed to a battery charging circuit which generates for a given range of ambient temperature a profile of SCR set voltage, i.e. the voltage at which the SCR becomes non-conducting, dependent on both cell temperature, under the influence of the prevailing ambient temperature, and cell voltage in a manner designed to accommodate to the aforesaid limitations.

BACKGROUND OF THE INVENTION

SCR-type charging circuits have been in manufacture for years. In a typical circuit the voltage potential at the SCR's cathode must be less than the voltage potential at the SCR's gate for the SCR to conduct, or turn to the "ON" state. The gate potential can be set at a desired level for a specific type of battery and the charger will return energy to the battery until that set potential is reached, at which point the SCR will automatically turn "OFF". However, in the typical SCR type charging circuit the set potential is not made to vary as in the present invention dependent on changes in both the cell temperature and cell voltage.

Here it should be noted that batteries of the kind being referred to are made up of one or more "cells" which are spoken of as comprising a "battery pack". Therefore, the terms "cell", "cells", "battery" and "battery pack" are sometimes used interchangeably.

The SCR circuit has worked well for charging SLA (sealed lead acid) and similar types of battery products which do not require critical cell temperature control under charge. More recently, new battery systems and in particular, nickel metal hydride (NiMh) batteries have become popular since NiMh batteries have an advantage in that they do not contain cadmium, as do nickel cadmium (NiCad) batteries, cadmium being a non-desired pollutant. Furthermore, the NiMh cells which make up a NiMh battery have an energy density about 80% greater than that of the cells which make up a NiCad battery thus allowing for longer equipment run time, or, smaller and lighter equipment with the same run time.

There are special concerns for NiMh batteries under charge. As previously mentioned, NiMh batteries have a critical upper temperature limit. In addition, they require a certain amount of self-generated heat to reach a full capacity of recharge. These two temperature conditions are relatively close together, requiring a charging system, which can allow one to be met, and, prevent the other from being reached. Attempts have been made to meet the NiMh battery charging control requirements. However, such attempts have led to very costly control means. The high cost of the control means has limited the market for both NiMh batteries and NiMh battery rechargers. Uncontrolled and relatively inexpensive charging circuits, like those presently available for recharging NiCad type batteries, can be used for recharging NiMh batteries, but such NiCad chargers if used for recharging a NiMh battery risk shortening the life of the NiMh battery because of excessive heat.

As background for later description reference is next made to FIG. 1A which is a schematic representation of a known SCR-type battery charger. The voltage potential at the cathode "C" of the SCR shown in FIG. 1A must be less than the voltage potential at the gate "G" for the SCR to conduct, or turn to the "ON" state. The gate potential can be set at a desired level for a specific type of battery and the charger will return energy to the battery until that set potential is reached, at which point the SCR will automatically turn "OFF." In the circuit of FIG. 1A, Zener Diode (ZD), resistors $R_1$, $R_2$, and potentiometer P are used to provide a controlled and consistent voltage to the gate G of the SCR over a wide range of AC input voltage to the transformer T. However, the FIG. 1A circuit lacks means for cell temperature control.

Two types of rectification are shown in schematic FIGS. 1A and 1B. FIG. 1A shows a Full Wave (FW) center tap rectifier, and FIG. 1B illustrates an alternative FW bridge rectifier either of which can be used without concern to the rest of the circuit. While the portion of the circuit connected to the rectifiers is not shown in FIG. 1B, it should be understood that such portion is similar to that of FIG. 1A. As previously stated, either type of rectification can be used with either of the circuits of the invention, but for simplification, only the FW center tap rectifier will be discussed by way of example throughout the rest of the description. The boxes BX, with an "X" therein on either side of the SCR as shown in FIG. 1A, schematically represent various accessory items that can be used in the circuit, but do not affect its operation. The accessories may include, by way of example, accessories such as a state of charge display, overload protection circuits, and impedance control.

Here it should be recognized that circuits of the kind illustrated in FIGS. 1A and 1B will not charge NiMh batteries with proper results. Use of such circuits for recharging NiMh batteries will cause the cells to overheat and experience a reduced cell life. On the other hand, NiCad batteries are sometimes recharged by use of a FIG. 1A or 1B circuit.

As further background, reference is next made to FIG. 2 which is a schematic diagram of another known type of battery charging circuit that helps to overcome the previously mentioned excessive heating problem particularly when charging NiMh batteries. The circuit illustrated in FIG. 2 is similar to that of FIG. 1A, but includes the addition of resistor $R_3$ and negative temperature coefficient (NTC) thermistor which operates both to control the end of voltage, and to provide a means by which to utilize cell temperature as a means for terminating charge. Thus, the circuit of FIG. 2, unlike the circuit of FIG. 1A, does provide a form of cell temperature control under charge. Those skilled in the art will understand that when making reference to a circuit such as shown in FIG. 2, the phrase "end of voltage" is conventionally used interchangeably with the term "set voltage" and that the "gate" voltage is not exactly the true "set" voltage but for practical purposes is treated as being equal to the true set voltage. The NTC thermistor has a variable resistance that changes in value to the inverse of the temperature being sensed. In other words, its resistance decreases with increasing temperature and visa versa. In order to function properly in a battery charging circuit, the NTC device is bonded to a cell in the battery pack to accurately sense battery temperature.

With a proper set of charge circuit components, it is recognized that the battery pack shown in FIG. 2 could achieve a desired rise in temperature to attain an approximate but less than full charge particularly of a NiMh battery, and the gate voltage potential could be set such that the charging circuit will cut off without reaching an unacceptable battery temperature when the battery is operating in a given ambient temperature. Of particular significance however is the fact that the FIG. 2 type circuit only allows an approximate but less than full capacity to be returned to a NiMh battery. That is, the charging circuit necessarily cuts off before the battery is fully charged. Furthermore, the time for recharge, with a circuit of the FIG. 2 type, can vary from about 1.5 hours up to about 12 hours depending on the charge current delivered by the recharger. The remaining small percentage, say for example 5%, of returned capacity is not obtainable in a well defined time period because of the random nature of the charge pulses in the nearly "OFF" state. Here it also should be noted that when the charger turns "OFF" in the FIG. 2 type circuit, it will pop "ON" and "OFF" at a random rate while attempting to return full capacity to the battery. In the FIG. 2 circuit, the SCR is hard OFF at the switch over point. Under this condition, the battery back emf will drift down until the set temperature/voltage point is reached which will "fire" the SCR or turn it to the ON state. In a short time, the battery is brought back to the cut off point and the SCR again turns OFF which causes the "popping" effect. Thus, for the reasons stated, full capacity is not truly obtainable with a circuit of the FIG. 2 type.

Users of battery charging circuits and particularly for those used for charging NiMh batteries oftentimes desire some form of charge indicator and mention has been made above of use of a state of charge display in circuits such as illustrated as BX in FIG. 1A. However, the above-mentioned "popping" ON and OFF is truly random in the FIG. 2 type circuit and predicting what the end of charge looks like on a display is difficult to obtain. Some charging circuits of the FIG. 2 type incorporating a charge indicator tend to register an "OFF" state most of the time, while other circuits tend to indicate "ON" or "OFF" at a fast cycle. Thus, while use of a NTC thermistor in the type charging circuit shown in FIG. 2 offers advantages accurate indication of the charge state is difficult to obtain with FIG. 2 type charging circuit.

Another approach to recharging batteries is found in U.S. Pat. No. 4,424,476 which describes a circuit in which the end of charging is made to depend upon the cell temperature exceeding the ambient temperature by a predetermined amount. The '476 patent is also recognized as illustrating a slow rate charge path established by a resistor in shunt with the SCR and designed to maintain the battery in overcharge above ambient. The circuit of the '476 patent however has several disadvantages among which is that of not being able to compensate for heat contributed by the charger itself to the ambient temperature. Another disadvantage arises in trying to determine a reasonably accurate ambient temperature since wherever the thermistor T-1 of the '476 patent is located it will be effected by such factors as direct air from an air conditioning unit, an open window, sunlight through a window and other extraneous ambient heat factors. Similarly the same conditions mentioned for T-1, i.e.: air conditioner open window, etc., will apply to battery thermistor T-2. While other disadvantages of the '476 patent recharging circuit could be pointed out, it is sufficient to observe that unlike the recharging circuit of the present invention, the '476 patent recharging circuit is not capable of accurately switching from a relatively fast charge rate to a relatively slow charge rate upon the battery being charged achieving a charge of about 95% of capacity.

When the circuitry of the '476 patent is compared to the battery charging circuitry of the present invention, it will be seen that in the circuitry of the invention, unlike in the circuitry of the '476 patent, a voltage corresponding to the temperature of the battery operating within a given range of ambient temperature is constantly compared with the battery terminal voltage. When this comparison indicates a preset condition, the invention circuitry causes the SCR of the invention circuitry to become non-conducting and charging of the battery to its full capacity to become dependent on a preset trickle current.

Thus, it becomes the primary object of the invention to provide a controlled, relatively fast charger for charging to substantially full capacity the type of battery characterized by having during recharging both a critical temperature limit and a need for a certain amount of self-generated heat in order to be able to reach a substantially full capacity of recharge.

While the primary object is that stated above as applied to any kind of battery of the described character, a particular object of the invention is that of providing an improved battery recharging circuit for a NiMh type battery.

While further recognizing the primary object as being that stated above, another object is to provide a battery recharging circuit which facilitates display of a substantially full charge.

Other objects will become apparent from the following detailed description and through practice of the invention.

SUMMARY OF THE INVENTION

The invention resides in the discovery with respect to recharging a battery of the type characterized by having during recharging both a critical temperature limit and a need for a certain amount of self-generated heat that both requirements can be met by incorporating in a recharging circuit of the FIG. 2 type means for permitting throughout a relatively wide range of ambient temperature a trickle current to flow through a shunt around the SCR after the SCR is turned OFF and at a level which causes the SCR to remain OFF while the battery being charged is permitted to reach a substantially full charge without exceeding the battery's critical temperature limit and simultaneously to self-generate such amount of heat as is required for the battery being charged to reach a substantially full charge.

The invention further resides in the discovery that the trickle current as recited above can be established in such a way as to eliminate intermittent turning ON and OFF or so-called "popping" of the SCR and permit use of a charge indicator operative to indicate when the battery being charged has reached a substantially full charge.

The invention charger circuitry enables the gate voltage to be set at a desired level for a specific type of battery operating at a particular battery temperature and the charger to return energy to the battery until that set voltage is reached across the battery terminals as indicated by the battery back emf (electromotive force) reaching a value across the battery terminals at the particular battery temperature equal to the set voltage.

The ambient operating temperature limit of the invention circuitry shown in FIGS. 3, 4, and 10 has been assumed for practical reasons to limit use of the battery charging circuitry of the invention to general office or indoor use, not intended for outdoor applications. The assumed range of ambient temperature under these conditions is thus assumed to vary from about 10° C. to about 40° C. By limiting the intended use in this way, the battery charging control circuitry of the invention can be made at reasonable cost and the invention circuitry can become of greater economical value to the marketplace.

BRIEF DESCRIPTION OF THE DRAWINGS

In order that the invention will become more clearly understood it will be disclosed in greater detail with reference to the accompanying drawings, in which.

DESCRIPTION OF THE PREFERRED EMBODIMENT

Figure 1A:
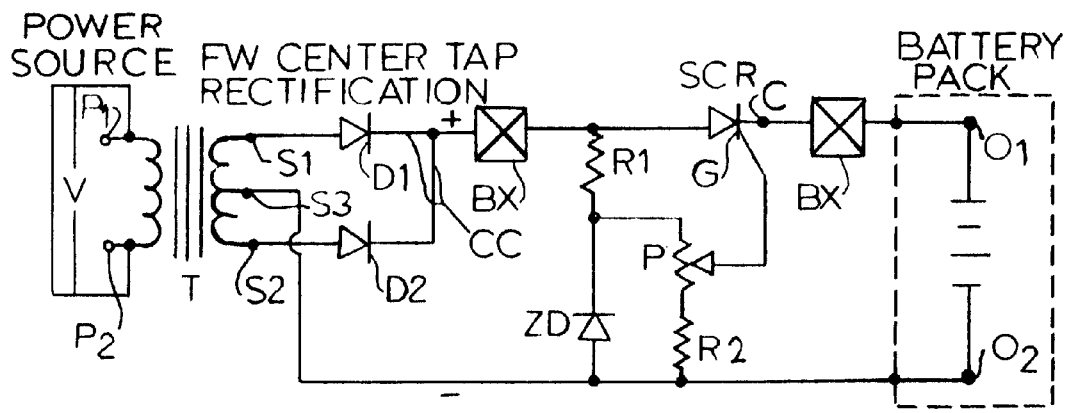
FIG. 1A is a schematic diagram of a conventional battery recharging circuit using a full wave center tap rectification transformer and a SCR circuit.
Figure 1B:
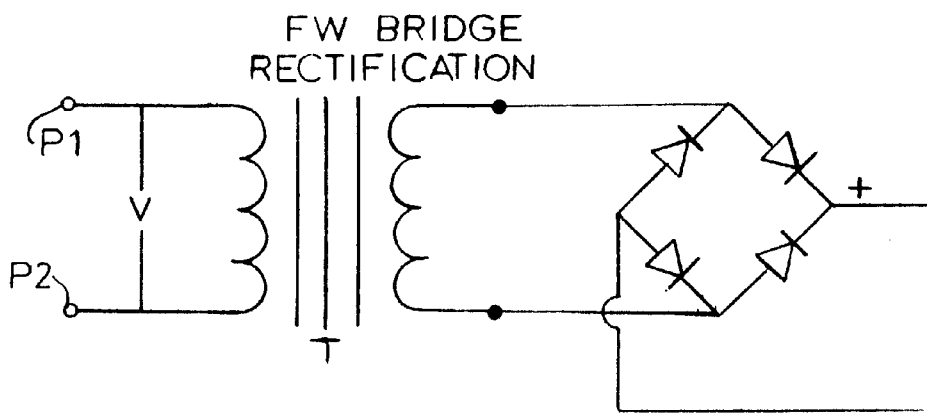
FIG. 1B is a schematic diagram of a battery recharging circuit similar to that of FIG. 1A but using a full wave bridge rectification transformer. While the portion of the circuit connected to the rectifier is not shown in FIG. 1B, it should be understood that such portion is similar to that of FIG. 1A.
Figure 2:
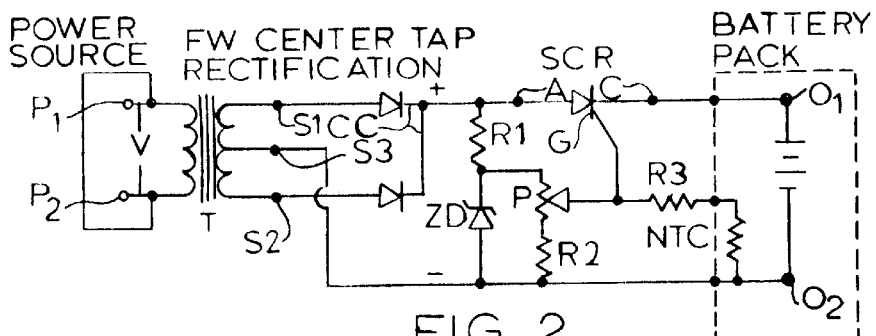
FIG. 2 is a schematic diagram of a battery recharging circuit incorporating a negative temperature coefficient (NTC) thermistor in a circuit arrangement in which the SCR is intended to turn "OFF" when a predetermined battery temperature consistent with the later described Set Voltage vs. Temperature Profile of the battery is reached but exhibiting a "popping" effect elsewhere described.
Figure 3:
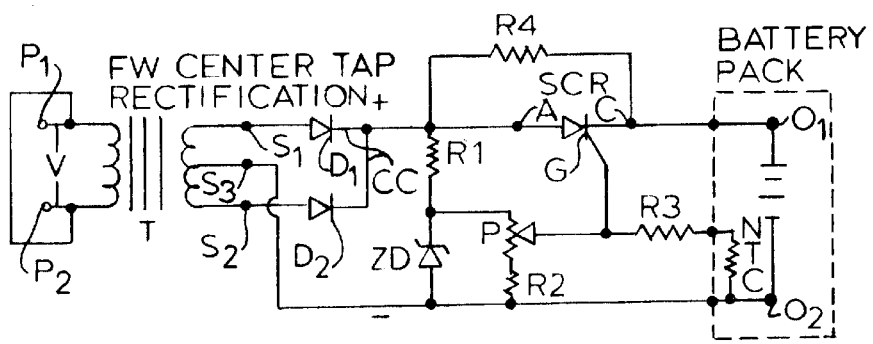
FIG. 3 is a schematic diagram of a battery recharging circuit according to a first embodiment of the present invention and particularly adapted for charging NiMh batteries.

FIG. 3 is a schematic diagram of a battery charging circuit according to a first embodiment of the invention and is operative to supply a controlled and consistent voltage to the gate of the SCR over a wide range of AC input voltage to the transformer T. Either of two types of rectification FW Center Tap or FW Bridge (as shown in FIGS. 1A and 1B) can be used in the present invention. For simplicity however, only FW Center Tap rectification as seen in FIG. 1A will be described by way of example. It should also be understood as previously referred to in reference to FIG. 1A that while not shown, the charging circuit of FIG. 3 may include accessory items both before and after the SCR.

With continuing reference to FIG. 3, a charging current is supplied by the charger of the invention to a rechargeable battery B having a positive battery terminal $O_1$ and negative battery terminal $O_2$. The battery B typically comprises one or more series-connected rechargeable cells. The charger is connectable to an external source of AC power V. Primary input terminals $P_1$ and $P_2$ of voltage transformer T connect to the power source V. The transformer secondary center tap output terminal $S_3$ is connected to the negative battery terminal $O_2$. The transformer secondary output terminals $S_1$, $S_2$ are each connected to the anode of a respective rectifier diode $D_1$, $D_2$ of a full-wave rectifier circuit to provide a pulsed DC unidirectional rectified charging current.

With further reference to FIG. 3, the output from rectifier diodes $D_1$ and $D_2$ are connected to the anode side A of an electronic switch, in this case, a silicon-controlled rectifier (SCR). The SCR is connected in series between the common cathodes CC of rectifier diodes $D_1$ and $D_2$ and positive battery terminal $O_1$. When the SCR is conducting, it establishes a charging current path between the cathodes CC of rectifier diodes $D_1$ and $D_2$ and positive terminal $O_1$ of the battery B being recharged. The zener diode ZD and resistors $R_1$, $R_2$, potentiometer P, R3, and NTC are used to provide a controlled voltage to the gate G of the SCR over a wide range of AC input voltage to the transformer T. The Negative Temperature Coefficient (NTC) thermistor is closely attached to a battery cell and is connected through a resistor R-3 to a potentiometer P which may, for example, be a carbon composition device with a wiper blade to set its resistance value. Of particular significance to the invention is the presence of trickle current charge resistor R-4 and its value selected to operate with other components to achieve the various objects of the invention as further discussed below.

Unique to the invention is the ability to control and make recharging to be dependent on both voltage control, i.e. in reference to the desired battery terminal voltage, and temperature control in reference to the desired battery temperature. "Voltage control" as used here refers to the exact point at which the battery would pass into a state causing cell deterioration due to the advent of fast rising cell temperature. At near full cell capacity, about 95% of full capacity, the cell temperature rises rapidly. The FIG. 3 circuit acts to detect this rise and the precise battery pack voltage during the temperature rise. Designed into the FIG. 3 circuit, by way of component selection as later illustrated by example, is a temperature vs. voltage table. A battery in high ambient, say 40° C., being recharged by the FIG. 3 circuit will actually shut off at a lower voltage than the same battery being recharged by the FIG. 3 circuit in a lower ambient thus protecting the battery from excessive high temperature even if 95% of capacity has not been attained. The FIG. 3 recharging circuit thus provides temperature/voltage control. Also to be noted is that the SCR gate voltage in the FIG. 3 circuit is set such that the SCR will turn OFF when the battery terminal voltage reaches approximately ninety-five percent (95%) of its intended value when in a nominal room ambient of 25C. The components of the invention charger circuit illustrated in FIG. 3 are also selected such that resistor R-4 in the shunt around the SCR passes current at a low level charge rate when the SCR is turned OFF. The function of the shunt including resistor R-4 is described more fully below.

The Zener Diode ZD is designed to be a stable voltage reference over a wide range of transformer input voltage and the state of the battery being charged. The voltage to the gate of the SCR varies inversely to the temperature of the battery pack. The gate voltage is set under specific laboratory conditions to a level which will allow return of approximately 95% of battery capacity at an ambient of 25C. As mentioned above the voltage/temperature control will protect the battery from adverse temperatures even if required to terminate charge before full capacity is reached. With ZD as a reference it can be seen in FIG. 3 that the gate voltage coming off the wiper of P will vary based on the parallel effect of the lower portion of P+$R_2$ shunted by $R_3$+NTC, recalling that NTC varies inversely to cell temperature. Gate current is significantly low and can be assumed to be zero for this analysis. Therefore, in an abnormally high ambient the component selection is such that a lower voltage is "delivered" at the gate and the SCR will be turned OFF prior to 95% of battery capacity in order to protect the battery. At lower ambient the gate voltage is raised and the cell is allowed to generate heat and some what more than 95% of battery capacity is reached before the SCR is turned OFF.

In order to fully recharge the battery, the trickle-current charge resistor $R_4$ is connected in parallel with the SCR. When the SCR is conducting, resistor $R_4$ carries an amount of current which aids in charging the battery but which current amount is less than when the SCR is non-conducting. When the SCR is non-conducting, a low-level charge current will continue to be supplied to the battery pack until some condition causes a drop in the battery back emf. Thus, when the SCR is non-conducting, the battery is generally only charged to approximately but less than full capacity, as for example about 95% capacity; trickle current from resistor $R_4$ continues to charge the battery at a relatively slow charge rate to affect 100% recharge. The slow low-level charge rate prevents the battery pack from overheating at the prevailing ambient temperature, which could cause damage to the battery. Components of the FIG. 3 circuit are selected so that the low-level charge rate is at a current value sufficient to safely maintain the battery at full capacity and provide battery back emf (electromotive force) at high enough voltage level to prevent the SCR from switching back to the "ON" state and at a level which will not cause excessive cell overheating within the range of ambient temperature within which the invention circuitry is intended to operate. "Safely" as used here, generally means maintaining cell temperature in a range which will not deteriorate the cells and reduce life.

Figure 4:
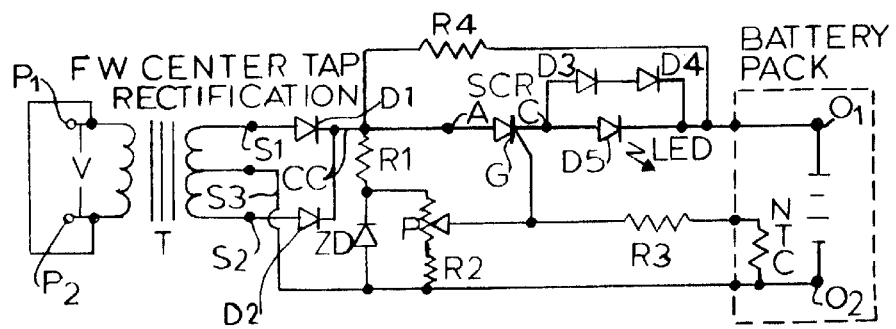
FIG. 4 is a schematic diagram of a battery recharging circuit, according to a second embodiment of the present invention and particularly adapted for charging NiMh batteries.
Figure 5:
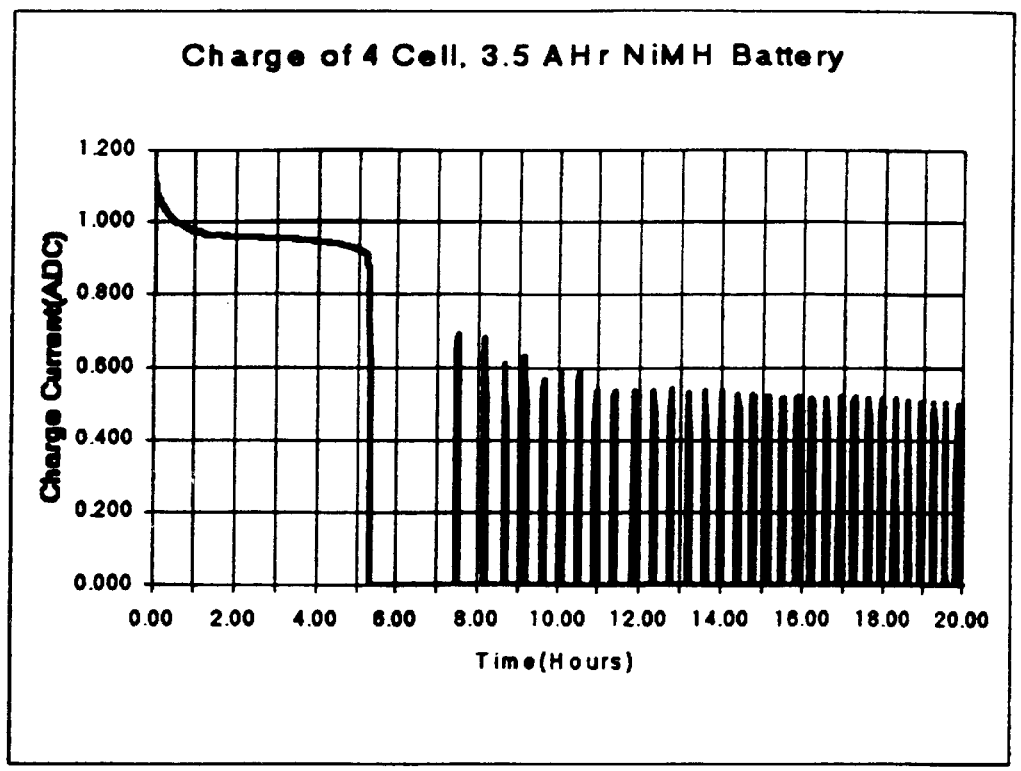
FIG. 5 is a plot of charge current expressed as "amps direct current" (ADC) versus time (hours) using the circuit of FIG. 2 in a charger designed to charge at 950 ma over a period of about six hours a 4 cell, 3.5A Hr. NiMh battery and illustrating the "popping" effect after the SCR cuts OFF.
Figure 6:
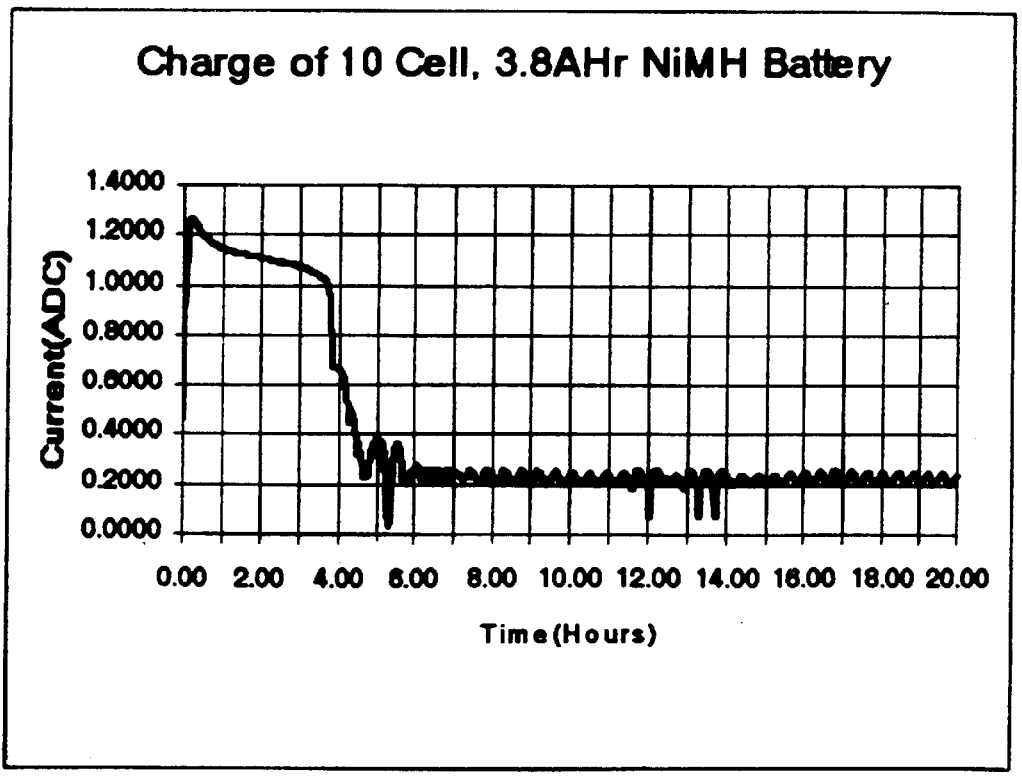
FIG. 6 is a plot of charge current (ADC) versus time (hours) using the circuit of FIG. 2 in a charger designed for charging at 1100 ma over a period of about 4 hours a 10 cell, 3.8 Hr. NiMh battery and illustrating another kind of popping effect after the SCR turns OFF.
Figure 7:
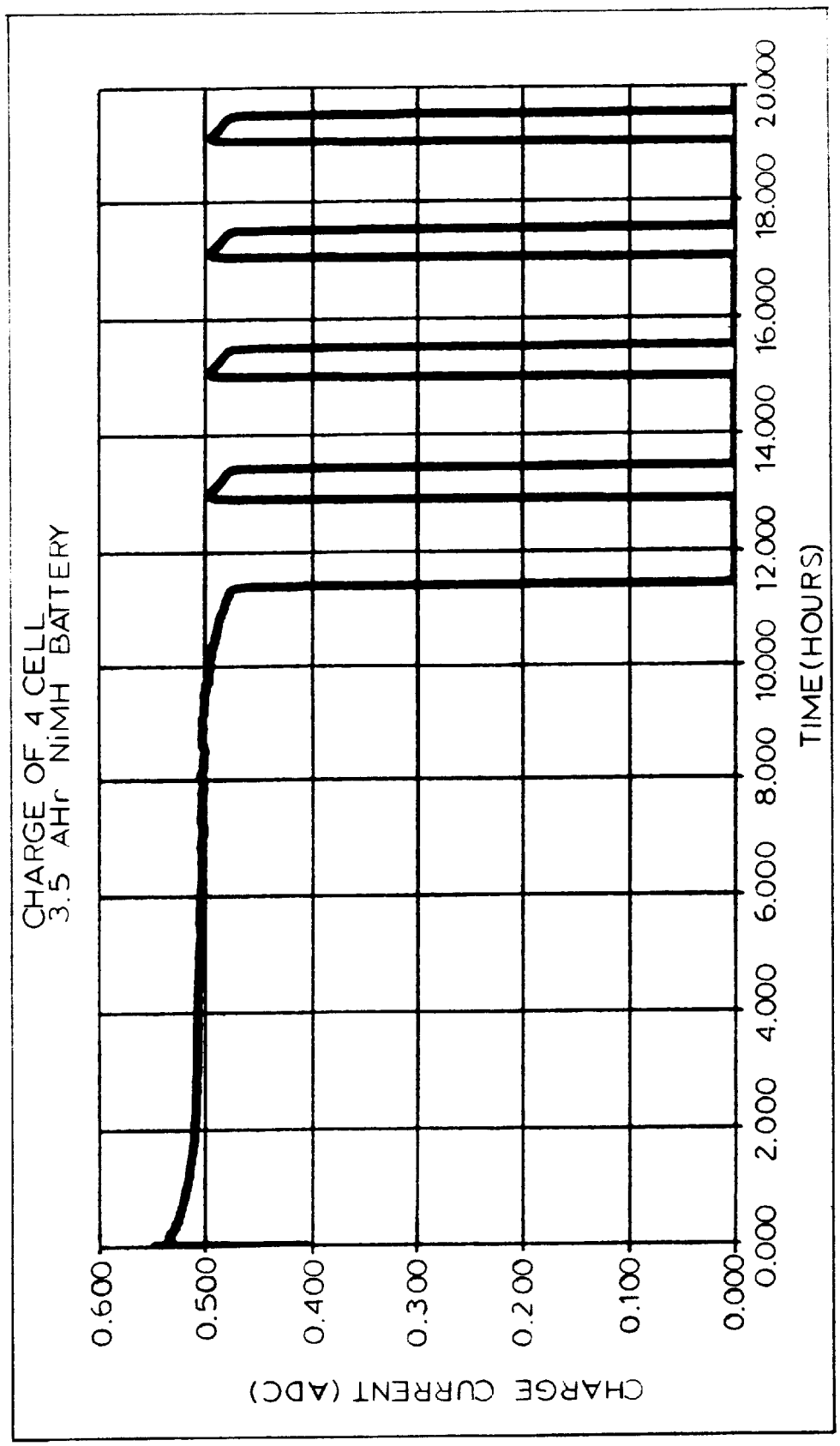
FIG. 7 is a plot of charge current (ADC) versus time (hours) using the circuit of FIG. 2 in a charger designed for charging at 500 ma over a period of about twelve hours a 4 cell, 3.5 A Hr. NiMh battery.
Figure 8:
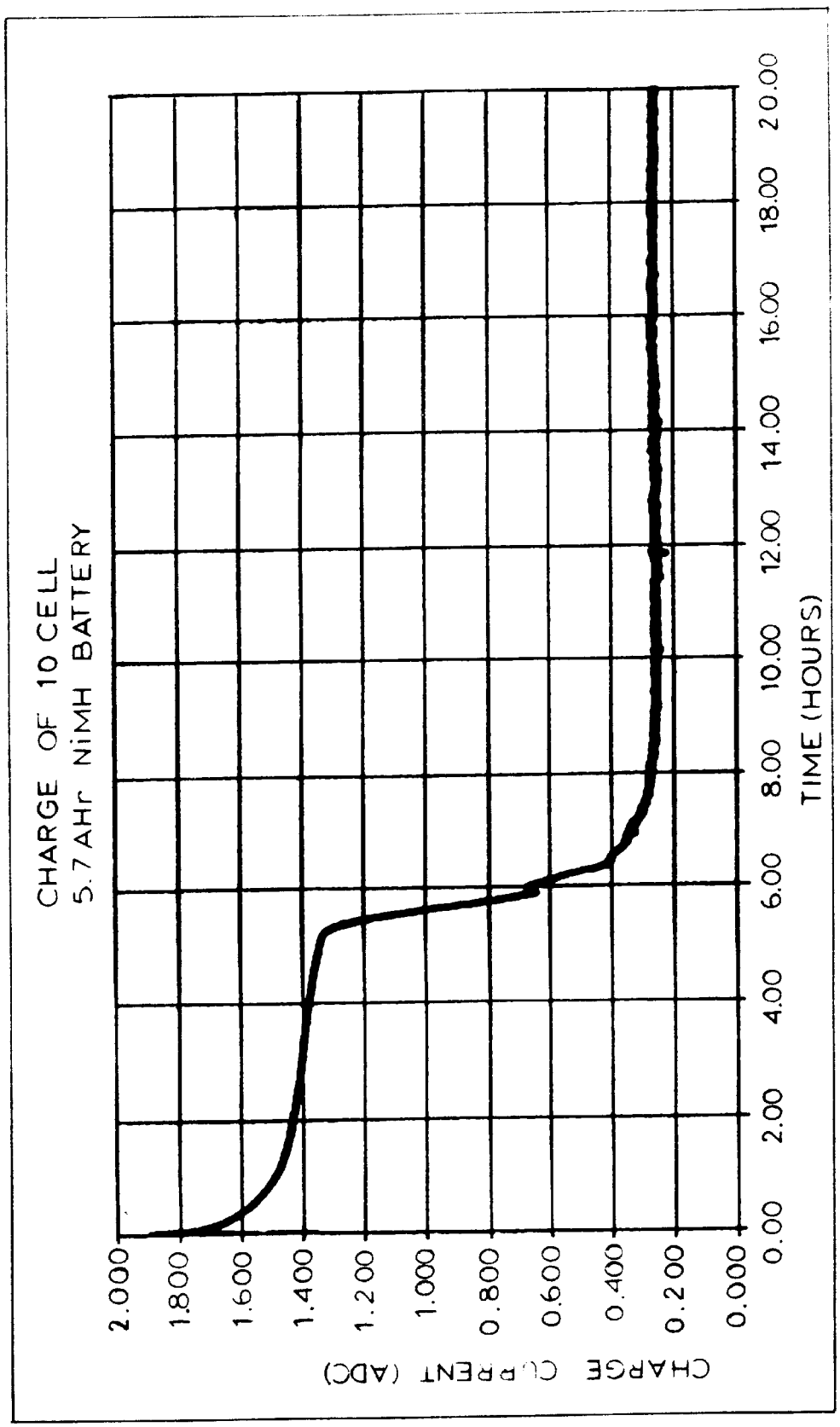
FIG. 8 is a plot of charge current (ADC) versus time (hours) using the circuit of FIG. 3 in a charger designed for charging at 1400 ma over a period of 5.5 hours a 10 cell, 5.7 A Hr. NiMh battery and illustrating the desired stable charge current in the "Low" or "trickle" charge state of the battery.
Figure 9:
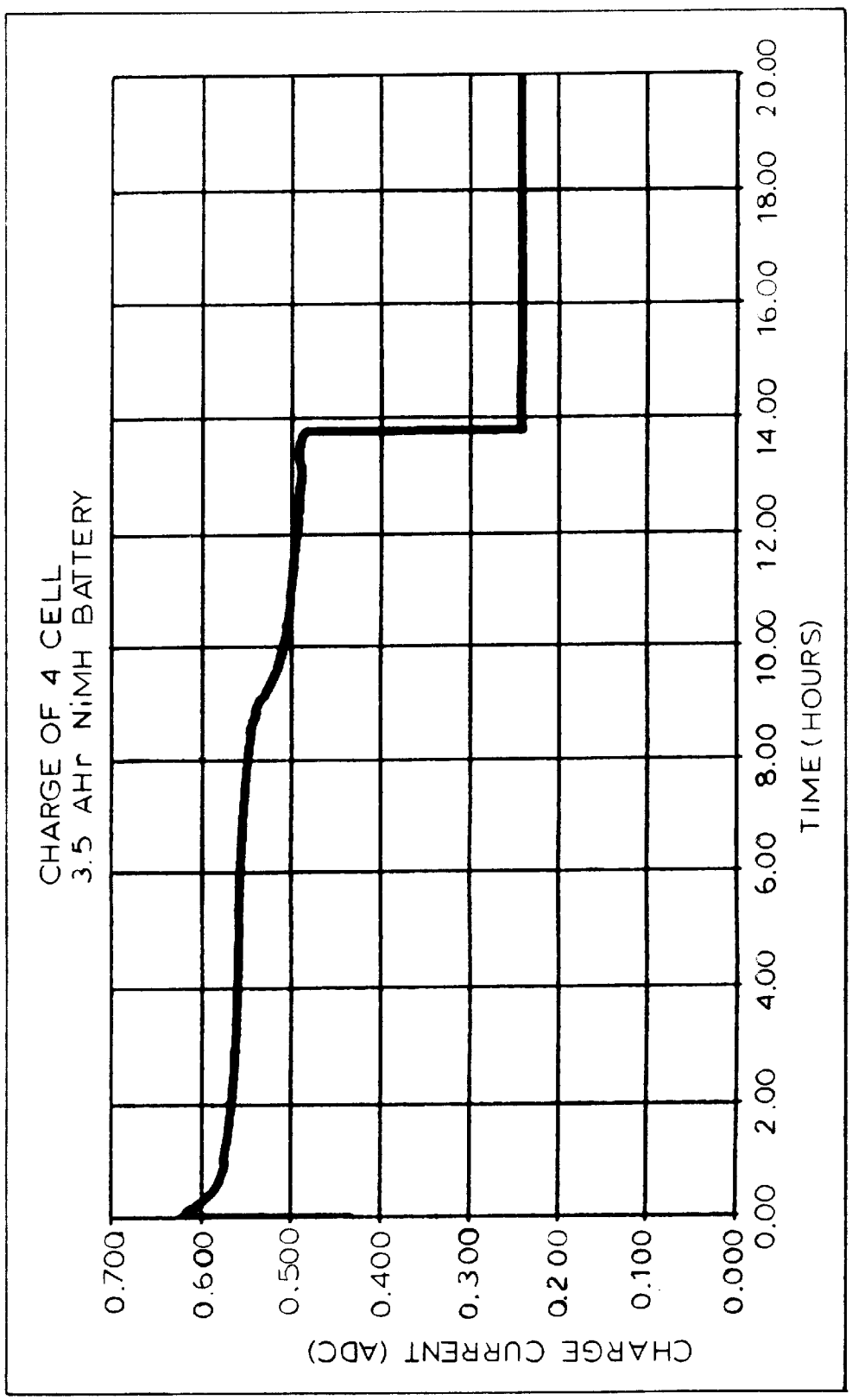
FIG. 9 is a plot of charge current (ADC) versus time (hours) using the circuit of FIG. 4 in a charger designed for charging at 560 ma over a period of 14 hours a 4 cell, 3.5 A Hr. NiMh battery and further illustrating the desired stable charge current in the "Low" or "trickle" charge state of the battery.

FIG. 4 illustrates a second embodiment of the present invention and which embodies all of the operating features previously described with reference to FIG. 3. Therefore, since the embodiment illustrated in FIG. 4 uses some features found in that of FIG. 3, the shared features will not be further described. In this second embodiment as seen in FIG. 4, within the $R_4$ trickle-current resistor connection, a pair of series connected diodes $D_3$ and $D_4$ are connected between the cathode end C of the SCR and terminal $0_1$ of battery pack B. In addition, an LED diode $D_5$ is also connected between the cathode end C of the SCR and terminal $0_1$ of the battery pack B. Diodes $D_3$ and $D_4$ are in parallel with diode $D_5$. Diodes $D_3$, $D_4$ act as a voltage regulator across the LED regardless of current being provided by the recharger to the battery pack and maintain a substantially fixed voltage drop at virtually all current levels within the current rating. As described above, when the SCR is cut-off, a low-level charge current continues to the battery though resistor $R_4$. When the charge through the SCR is cut-off, the LED diode will be locked as OFF, indicating that the battery has been at least 95% recharged. Conversely, when the battery has yet to reach 95% recharge, charge current flows from the SCR through the LED diode and to the battery B. Thus, the LED diode when locked in the ON position indicates that the battery has not reached 95% recharge.

As previously referred to in reference to boxes BX in FIG. 1A, accessory items such as a state of charge display can be located either before or after the SCR. Thus, while not shown, it should be appreciated that the LED diode D5 and parallel diodes D3 and D4 seen in FIG. 4 could, as with all accessories, be located before the SCR in a position located between the juncture of R4 and R1 and the anode A of the SCR.

Figure 10:
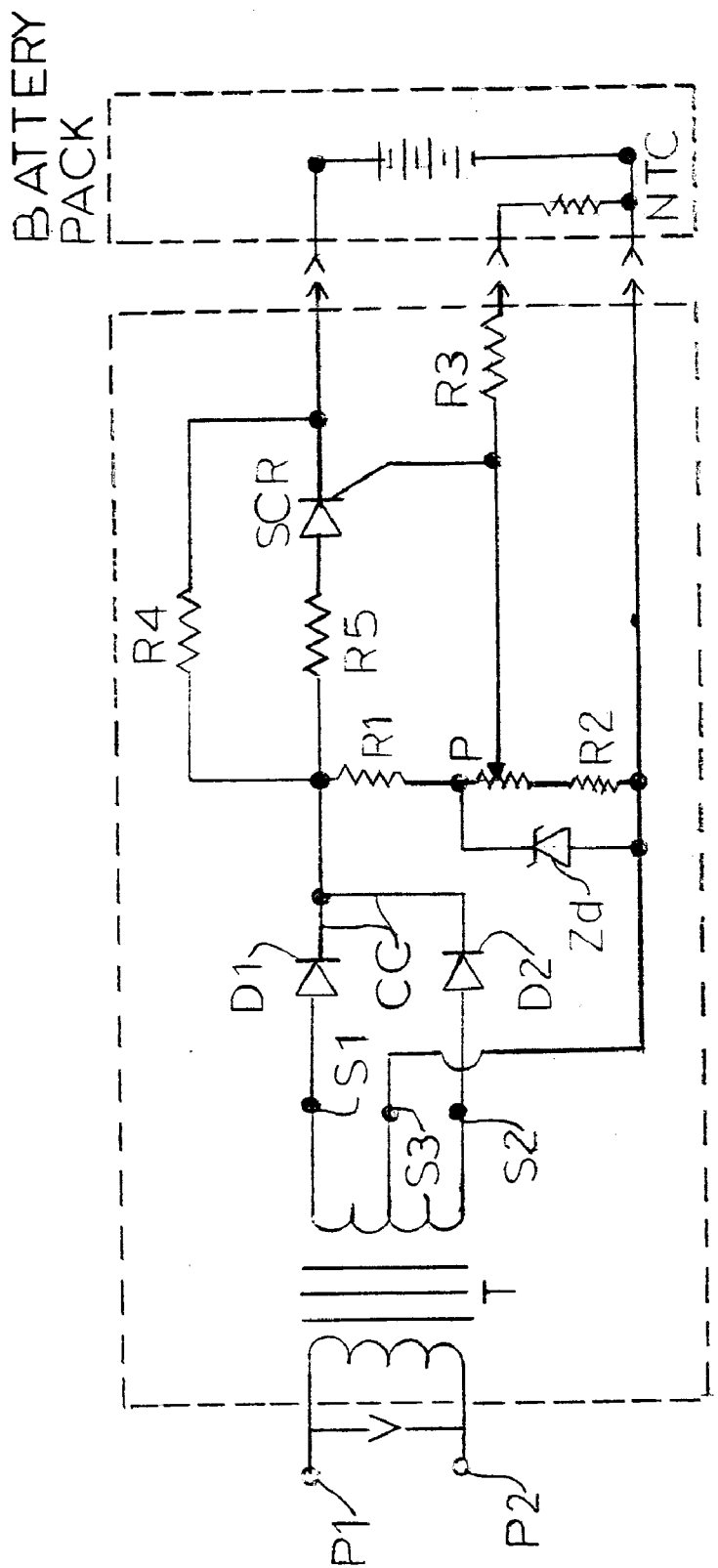
FIG. 10 is a schematic diagram of a battery recharging circuit according to a third embodiment of the invention and particularly adapted for charging NiMh batteries.

Selection of the components for a voltage/temperature controlled charger incorporating features of the present invention will be appreciated from the following exemplary third embodiment illustrated in FIG. 10. The embodiment shown in FIG. 10 incorporates previously described features of FIG. 3 and FIG. 4, with the addition of resistor $R_5$, whose characteristics are described below. Features shared by FIGS. 3, 4 and 10 will not be further described.

The battery pack B used by way of example in reference to FIG. 10 consists of an 8 cell 4 AH (Amp Hour) Nickel Metal Hydride (NiMh) battery. Battery pack B in this example has a 10 K ohm NTC (negative temperature coefficient) thermistor. The battery charger of FIG. 10 is powered by a 120V, 10VA transformer with a turns ratio Primary/Secondary of 1050/152. Potentiometer P in this same example is set to deliver an output of 11.28VDC @200 ma with the thermistor in a 50° C. ambient.

The following represents an example of the components and their characteristics as used in the embodiment of FIG. 10:

| Battery Charger Components | Component Characteristics |
| --- | --- |
| $D_1/D_2$ | IN4004 Silicon Rectifier |
| P | 2K Ohm 0.2 W Potentiometer |
| SCR | T106F2, 15 V, 400 mw, 5% |
| $R_1$ | 2K Ohm, ½ W, 5% |
| $R_2$ | 27K Ohm, ½ W, 5% |
| $R_3$ | 1.5K Ohm, ½ W, 5% |
| $R_4$ | 20 Ohm, 4 W, 5% |
| $R_5$ | 1.1 Ohm, 2 W, 5% |
| XFMR | Power Transformer |
| B | 8 Cell, 4AH NiMh Battery |
| NTC | 10K Ohm: supplied as part of battery assembly |

With particular regard to the shunt resistor R-4 seen in FIGS. 3, 4, and 10, the following considerations among others are taken into account in selecting its value:

1. The amount of current needed to keep the SRC OFF in some selected range of ambient temperature such as 10° C. to 40° C. ambient.
2. The amount of current needed to keep the battery back emf high enough to keep the SCR OFF.
3. The highest level of current which can be used for charging without risking battery deterioration.

Figure 11:
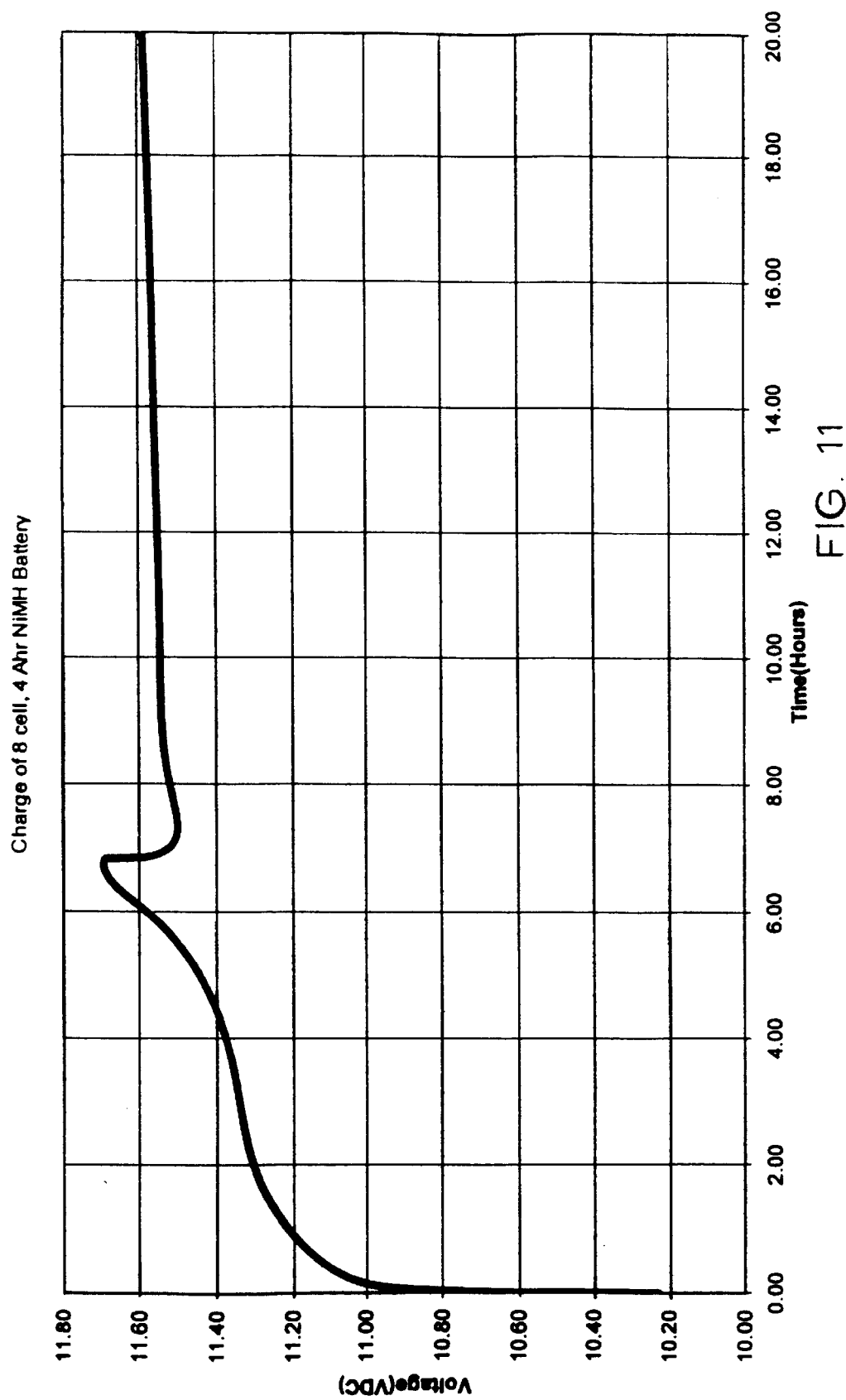
FIG. 11 is a plot of voltage (VDC) versus time (hours) using the circuit of FIG. 10 in a charger designed for charging at 900 ma over a period of 7 hours an 8 cell, 4 A hr. NiMh battery.
Figure 12:
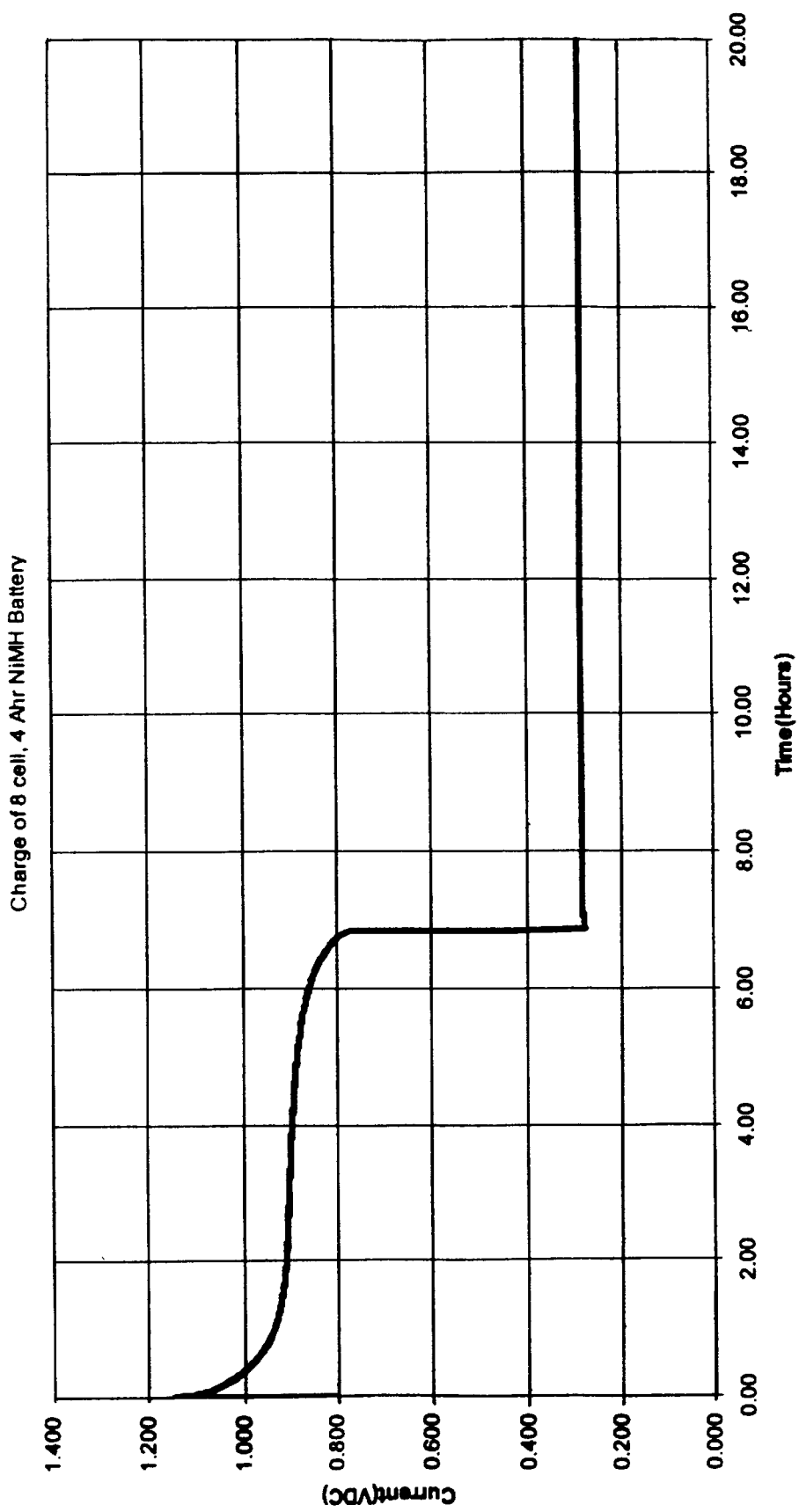
FIG. 12 is a plot of current (ADC) versus time (hours) using the circuit of FIG. 10 in a charger designed for charging at 900 ma over a period of 7 hours an 8 cell, 4 A Hr. NiMh battery.
Figure 13:
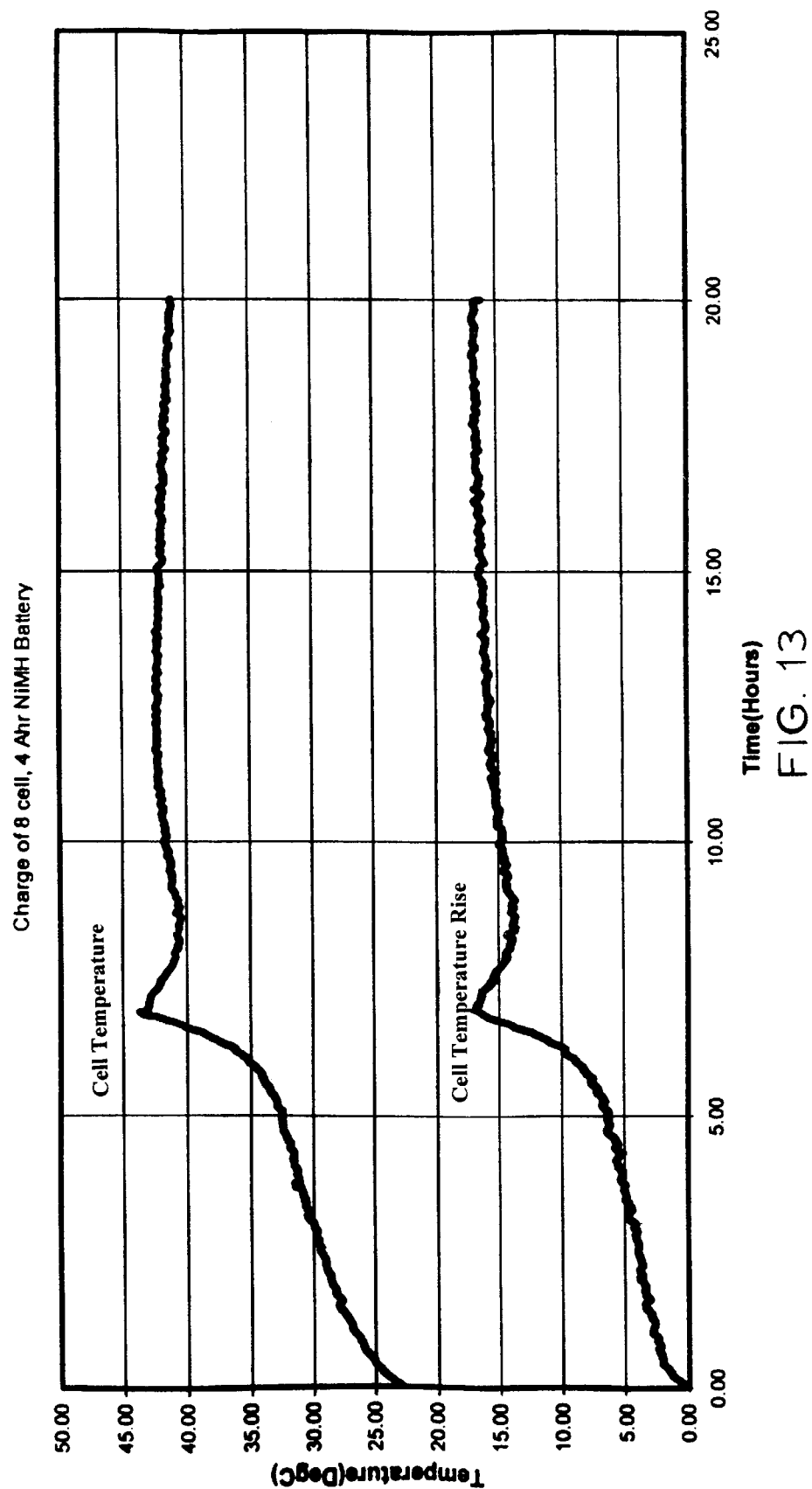
FIG. 13 is a plot of cell temperature Max (degree C.) and cell temperature Rise (degree C.) resulting from use of a charger designed for charging at 900 ma over a period of 7 hours a 8 cell, 4 A Hr. NiMh battery using the circuit of FIG. 10.

FIGS. 11, 12 and 13 graphically illustrate performance curves of the respective battery terminal voltage, charge current, and cell temperature/temperature rise of the battery pack, under conditions of charge utilizing the circuitry embodiment of FIG. 10.

With further reference to FIGS. 10, 11, 12, and 13, circuit components including the power transformer T as in FIG. 10 are selected to operate within a range such that the components generate a regulated but varying "set" voltage applied to the gate of the SCR. The "set voltage" which is being referred to should be understood as being a laboratory and/or production value which is "set" under a specified ambient temperature and specified cell temperature rise anticipated under what are assumed to be "normal" battery charging conditions. Values for the circuit components are such that the set voltage as compared to the voltage corresponding to the battery absolute temperature (ambient temperature plus cell temperature rise) creates a charge profile that is ideal for the particular type of cells being charged. At the start of charge on a discharged battery with no temperature rise the resistance value of the NTC is high. As the battery temperature rise increases and thus the battery absolute temperature increases due to the electrochemical action during charge, resistance value of the NTC drops which causes the set voltage to drop due to the lower resistance in the path which includes R-3 and the NTC. This action continues to a point during the charge cycle when the temperature rise of the cells comprising the battery being charged increases dramatically. This point is at approximately but less than full charge and can be visualized in FIG. 13.

The only circuit component of the exemplary circuit shown in FIG. 10 that is specifically selected because of its temperature characteristic is the NTC thermistor whose resistance varies based on the temperature of the battery to which it is attached. All other temperature/resistance characteristics in the circuit are fixed and selected to give the desired cell temperature/set voltage profile, as shown below for the exemplary model, which is appropriate for the type of battery being charged (i.e. battery chemistry and plate type) and the number of cells that make up the battery pack.

A typical Set-Voltage vs. Temperature Profile for the FIG. 10 circuitry would be as fallows:

| Cell Temp (° C.) | Set Voltage (DC) |
|---|---|
| 10 | 13.18 |
| 20 | 12.72 |
| 25 | 12.45 |
| 30 | 12.16 |
| 40 | 11.51 |
| 50 | 10.83 |
| 60 | 10.17 |
| 70 | 9.56 |

The term "cell temp (° C.)" as used above should be understood as meaning the so-called "absolute temperature" and representing the combination of ambient temperature, i.e. the room temperature, plus the temperature rise of the battery due to charging the battery and at desired point of SCR switch over to the OFF state.

It should be noted while not shown, that a plot of the cell temperature-set voltage data listed above indicates a substantially linear relation.

During the time period just referred to above, from start of charge to near the end of charge, the battery terminal voltage will also be rising in a similar mode as may be visualized in FIG. 11. These conditions, that is rising cell temperature with resulting lower set voltage and rising battery back emf result in the ideal "set voltage" being attained under the proper battery condition.

Circuit component values for the charging circuitry of the invention as in FIGS. 3, 4, and 10 are also selected to allow for varying ambient temperature within a given range of ambient temperature. As ambient temperature rises, the battery temperature rises. However the battery back emf does not increase correspondingly to the point of approximately but less than full charge voltage. The component selection allows the battery charger to continue charging until the voltage corresponding to battery temperature when compared to the voltage corresponding to battery back emf indicates that approximately but less than full charge has been reached at which point a set voltage on the "charge profile" turns the SCR to the OFF state. The opposite is true for a lower ambient. This near "end of charge" point will thus vary and the amount of energy returned to the battery will vary when charging the battery at about and above full capacity as for example being within a 80% to 95% level. The correction is however small.

In summary, the circuitry of the invention as embodied in the illustrative circuits of FIGS. 3, 4 and 10 has these several advantages:

1. The status of charge level is indicated through use of a relatively inexpensive and reliable visual indicator circuit.
2. Return of the battery to full capacity can be predicted within a well defined time period.
3. The battery being charged and particularly the NiMh type battery can be charged to substantially full capacity.
4. Reaching of a substantially full charge can be indicated.
5. The so-called "popping effect" is eliminated.
6. Exceeding the critical temperature limit of the battery being charged is avoided.
7. The battery being charged is permitted to self-generate during recharging such amount of heat as is needed to facilitate charging the battery to substantially its full charge.
8. Normal cell life of the battery is maintained after the battery has been recharged.
9. The battery being charged can be charged at virtually any rate by close control of the battery voltage and its operating temperature.
10. Use in a wide range of indoor temperature is permitted since the battery being charged can be recharged over a relatively wide temperature range by reason of the precise voltage and temperature characteristics which can be designed into the circuit by appropriate selection of components.
11. The trickle or low state current is both controlled and made predictable.
12. Batteries other than the NiMh type, such as NiCad, can be charged by close control of their voltage and operating temperature through appropriate selection of the components.
13. Any semiconductor which can be "programmed" in the manner of the described invention can be used in place of the SCR.
14. A battery can be brought back to near, e.g. 95%, capacity in a time range of less than 1½ hour to more than 12 hours, based on customer request, and 100% capacity in an additional short time frame.

15. The problem of an indefinable charge indicator at end of charge has been solved by reason of the LED being "ON" when the battery is undercharged and near but at less than full capacity.

16. The temperature of the battery charging circuit as distinct from the temperature of the battery does not become a factor in determining how charging of the battery is to be controlled.

17. A battery charging circuit is provided with all of the foregoing advantages and at reasonable cost.

The above detailed description of a preferred embodiment of the invention sets forth the best mode contemplated by the inventor for carrying out the invention at the time of filing this application and is provided by way of example and not as a limitation. Though the embodiments described above in reference to FIGS. 3, 4, and 10 utilize one technique for implementing the voltage/temperature controlled charger of the invention, certain modifications and variations thereof are possible. Thus, the above description of the preferred embodiment as referred to in FIG. 10 is exemplary and should not be considered as limiting the scope of the present invention. Accordingly, various modifications and variations obvious to a person of ordinary skill in the art to which it pertains are deemed to lie within the scope and spirit of the invention as set forth in the following claims.

What is claimed is:

1. Apparatus for supplying a controlled charging current to a sealed rechargeable battery having at least one cell and of the type which during the process of being recharged creates self-generated heat and has both a critical temperature limit and a requirement for a certain amount of self-generated heat to reach a full capacity of recharge, comprising:
    (a) means adapted to be connected to an external AC electrical source for providing a DC charging current;
    (b) controllable switching means connected in series between said means for providing a DC charging current and said battery and operable between a conducting state wherein charging current is supplied through the switching means to the battery and a non-conducting state wherein the switching means blocks the flow of charging current to the battery;
    (c) thermal sensing means bonded to the battery and operative to develop a control voltage according to the temperature rise of the battery and the ambient temperature at the battery location, the combined temperature being referred to as the absolute temperature of the battery;
    (d) switching control means responsive to both the control voltage developed by the thermal sensing means and the voltage of said battery for developing a set voltage whose value depends on both said control voltage and the voltage of said battery and is operative when said set voltage is below some given value for maintaining said switching means in a conducting state during which said charging current is enabled to flow through the switching means at a relatively high rate and operative when said set voltage is at or above said given value for maintaining said switching means in a non-conducting state, said switching means being operative such that said given value corresponds to a value indicating that the battery has reached a preset percentage within the range of 80–95% of its full capacity;
    (e) a shunt resistor connected between the input and output terminals of the switching means for providing a relatively slow rate of charging current between said charging current providing means and the battery when said switching means is in a non-conducting state and to maintain said charging current at a level such that during passage of said charging current through said shunt, the back emf of said battery is kept high enough to keep said switching means in a non-conducting state, low enough to avoid deterioration of said battery and sufficient to cause said battery to reach substantially full charge; and
    (f) wherein the components of said apparatus are selected to vary said set voltage in accordance with a profile relating said set voltage to said battery absolute temperature.

2. Apparatus as claimed in claim 1 wherein the controllable switching means includes silicon controlled rectifier means and the thermal sensing means includes thermistor means.

3. Apparatus as claimed in claim 1 including display means responsive to the controllable switching means reaching said non-conducting state.

4. Apparatus as claimed in claim 1 wherein the range of ambient temperature within which said apparatus is intended to operate is about 10° C. to about 40° C.

5. A method for supplying a controlled charging current to a sealed rechargeable battery having at least one cell and of the type which during the process of being recharged creates self-generated heat and has both a critical temperature limit and a requirement for a certain amount of self-generated heat to reach a full capacity of recharge, comprising:
    (a) establishing means for providing a DC charging current;
    (b) establishing controllable switching means connected in series between said means for providing a DC charging current and said battery and being operable between a conducting state wherein charging current is supplied through the switching means to the battery and a non-conducting state wherein the switching means blocks the flow of charging current to the battery;
    (c) establishing thermal sensing means bonded to the battery and in response to the temperature rise of the battery operating at some ambient temperature within a selected range of ambient temperature being operative to develop a control voltage which varies according to the combined said ambient and rise in battery temperature referred to as the absolute temperature;
    (d) establishing switching control means responsive to both said control voltage and the voltage of said battery for developing a varying set voltage and is operative when the value of said set voltage is at or below a given value for maintaining said switching means in a conducting state and is operative when said set voltage is above said given value of maintaining said switching means in a non-conducting state, said given value being determined so as to indicate that the battery voltage has reached a preset percentage within the range of 80% to 95% of its full capacity;
    (e) establishing a shunt resistor connected between the input and output terminals of said switching means for providing a relatively slow rate of charging current between said charging current providing means and the battery when the said switching means is in a non-conducting state;
    (f) establishing a set voltage profile of desired set voltages at given absolute battery temperatures and which takes into account the critical temperature, and self-generated heat requirement limits of said battery; and (g) utilizing said DC charging current, switching thermal sensing, switching control, and shunt resistor means for recharging said battery according to said profile such that said battery becomes substantially fully charged.

6. A method as claimed in claim 5 including the step of operating circuitry which includes said means at an ambient temperature within the range of about 10° C. to about 40° C.

7. The method of controlling the gate voltage of an SCR through which battery charging current passes when in a conducting state comprising:
  (a) establishing a charging circuitry having:
    (i) means to detect both a first voltage representing the voltage of the battery being charged and a second voltage representing the absolute temperature of the battery while being charged within a range of ambient temperature, the combined temperature rise of the battery and ambient temperature being considered as the absolute temperature of the battery; and
    (ii) means controlled by said first and second voltages for producing said gate voltage in correspondence with an absolute temperature-battery voltage profile which enables said gate voltage to assume a value at any ambient temperature within said range which places said SCR in a non-conducting state related to some near but less than complete full charge capacity within the range of 80% to 95% of its full capacity; and
  (b) controlling the gate voltage while using and operating said circuitry within a range of ambient temperature of about 10° C. to about 40° C.

* * * * *